(12) United States Patent
Romer et al.

(10) Patent No.: US 10,113,024 B2
(45) Date of Patent: Oct. 30, 2018

(54) ARYLCYCLOBUTENES

(71) Applicants: Dow Global Technologies LLC, Midland, MI (US); Rohm and Haas Electronic Materials LLC, Marlborough, MA (US)

(72) Inventors: Duane R. Romer, Midland, MI (US); Matthew M. Yonkey, Sanford, MI (US); Michael K. Gallagher, Hopkinton, MA (US); Michelle Riener, Watertown, MA (US)

(73) Assignees: Dow Global Technologies LLC, Midland, MI (US); Rohm and Haas Electronic Materials LLC, Marlborough, MA (US)

( * ) Notice: Subject to any disclaimer, the term of this patent is extended or adjusted under 35 U.S.C. 154(b) by 39 days.

(21) Appl. No.: 15/346,938

(22) Filed: Nov. 9, 2016

(65) Prior Publication Data
US 2017/0174810 A1    Jun. 22, 2017

Related U.S. Application Data

(60) Provisional application No. 62/270,068, filed on Dec. 21, 2015.

(51) Int. Cl.
| | |
|---|---|
| *C08F 230/08* | (2006.01) |
| *C09D 143/04* | (2006.01) |
| *C08G 61/02* | (2006.01) |
| *C08G 61/12* | (2006.01) |
| *C09D 165/00* | (2006.01) |

(52) U.S. Cl.
CPC ............ *C08F 230/08* (2013.01); *C08G 61/02* (2013.01); *C08G 61/12* (2013.01); *C09D 143/04* (2013.01); *C09D 165/00* (2013.01); *C08G 2261/135* (2013.01); *C08G 2261/334* (2013.01); *C08G 2261/344* (2013.01); *C08G 2261/3424* (2013.01); *C08G 2261/46* (2013.01); *C08G 2261/62* (2013.01); *C08G 2261/65* (2013.01); *C08G 2261/76* (2013.01); *C08G 2261/90* (2013.01)

(58) Field of Classification Search
None
See application file for complete search history.

(56) References Cited

U.S. PATENT DOCUMENTS

| | | | |
|---|---|---|---|
| 4,812,588 A | 3/1989 | Schrock | |
| 5,025,080 A * | 6/1991 | Wong .................... | C08G 61/12 528/170 |
| 5,136,069 A | 8/1992 | DeVries et al. | |
| 5,138,081 A | 8/1992 | DeVries et al. | |
| 6,420,093 B1 | 7/2002 | Ohba et al. | |
| 2004/0148766 A1 | 8/2004 | Noguchi et al. | |

FOREIGN PATENT DOCUMENTS

| | | |
|---|---|---|
| JP | 2003287882 A | 10/2003 |
| JP | 2004031712 A | 1/2004 |
| JP | 2004224817 A | 8/2004 |
| JP | 2005062405 A | 3/2005 |
| WO | 9425903 A1 | 11/1994 |

OTHER PUBLICATIONS

Search report for corresponding Europe Application No. 16 20 3567 dated May 9, 2017.
Kmon et al, "Mechanical Properties and Dynamic Viscoelasticity of Liquid Polybutadiene/Epoxy Resin Blends," Polymer Chemistry, 1973, pp. 532-535, vol. 30, No. 341.

\* cited by examiner

*Primary Examiner* — Erma C Cameron
(74) *Attorney, Agent, or Firm* — S. Matthew Cairns

(57) ABSTRACT

Arylcyclobutene polymers having improved physical properties, such as tensile strength, are provided. Compositions and methods for coating such arylcyclobutene polymers are also provided.

16 Claims, No Drawings

ARYLCYCLOBUTENES

This application claims the benefit of provisional application Ser. No. 62/270,068, filed on Dec. 21, 2015.

The present invention relates generally to the field of polymer materials, and more particularly to arylcyclobutene-based polymers useful in the manufacture of electronic devices.

Arylcyclobutene-based polymers are used as dielectric materials in a variety of electronic applications, such as microelectronic packaging and interconnect applications. Arylcyclobutene-based polymers possess many desirable properties for these applications. However, these polymers do suffer from certain mechanical limitations, such as low fracture toughness, low elongation and poor tensile strength, which limits the use of these polymers in certain electronic applications.

One approach to improving the mechanical properties of arylcyclobutene-based polymers is disclosed in U.S. Pat. No. 6,420,093. This patent discloses compositions providing benzocyclobutene-based polymers having improved toughness, the compositions comprising a) at least one precursor compound selected from arylcyclobutene monomers, arylcyclobutene oligomers, and combinations thereof; and b) a polymer or oligomer having a backbone comprising ethylenic unsaturation (that is, carbon-carbon double bond(s)) and terminal acrylate or methacrylate groups. The toughening additives disclosed in this patent have a significant amount of carbon-carbon double bonds in the polymer backbone. However, when these compositions are used in certain photopatterning applications, the improved elongation toughness of the benzocyclobutene polymers is lost due to competing reactions involving the carbon-carbon double bonds of the added polymer or oligomer. In addition, residual carbon-carbon double bonds in the added polymer backbone may lead to yellowing of the material over time, which may be detrimental for certain applications. Accordingly, there remains a need for alternative materials that can provide arylcyclobutene-based materials having improved mechanical properties.

Published European Patent Application EP527272 A1 discloses a benzocyclobutene (BCB) resin having improved properties, such as improved flexibility, strength and anti-cracking properties. The BCB resin in this patent application is prepared by reacting a bis-benzocyclobutene (bis-BCB) monomer with an unsaturated compound (dienophile monomer) having a higher dienophile activity than the unsaturation in the bis-BCB monomer. The dienophile monomers have a single site of ethylenic or acetylenic unsaturation. One such dienophile monomer is maleic anhydride. The dienophile monomers are used in a relatively lower amount relative to the bis-BCB monomer (0.001 to 0.2 mol/mol bis-BCB) and functions to control the degree of polymerization of the bis-BCB monomer. Basically, the dienophile monomer, with its single dienophile moiety, functions to terminate a growing polymer chain, thereby reducing the molecular weight of the polymer chain. While certain properties of these polymers may be improved, other properties may suffer from this approach, such as having a lowered chemical resistance as compared to conventional BCB resins. In particular, when these conventional polymers are used in a photodielectric material, the lower molecular weight polymer will reduce the contrast (or dissolution rate difference) between exposed and unexposed regions, resulting in poor resolution and a relatively large film thickness loss in unexposed regions.

The present invention provides a polymer comprising as polymerized units one or more arylcyclobutene first monomers and one or more second monomers having two or more dienophilic moieties and having one or more acid moieties chosen from carboxylic acid, protected carboxylic acid, and sulfonic acid. The second monomers possess two or more dienophilic moieties as well as one or more of the above acid moieties.

Also provided by the present invention is a composition comprising the polymer described above and one or more organic solvents.

Further, the present invention provides a method of forming a film on a substrate comprising: providing a substrate; coating a layer of the composition described above on a surface of the substrate; and curing the coating.

A method of improving one or more of tensile strength and elongation of an arylcyclobutene polymer comprising polymerizing one or more arylcyclobutene monomers with one or more dienophilic monomers having two or more dienophilic moieties and one or more acid moieties chosen from carboxylic acid, protected carboxylic acid, and sulfonic acid.

Additionally provided by the present invention is a substrate comprising a cured film formed from the composition described above.

As used throughout this specification, the following abbreviations shall have the following meanings, unless the context clearly indicates otherwise: ° C.=degree Celsius; min=minutes; hr.=hours; g=gram; L=liter; μm=micron=micrometer; nm=nanometer; mm=millimeter; mL=milliliter; MPa=megapascal; $M_w$=weight average molecular weight; $M_n$=number average molecular weight; and AMU=atomic mass unit. Unless otherwise noted, "wt %" refers to percent by weight, based on the total weight of a referenced composition.

The term "alkyl" includes linear, branched and cyclic alkyl. Likewise, "alkenyl" refers to linear, branched and cyclic alkenyl. "Aryl" refers to aromatic carbocycles and aromatic heterocycles. As used herein, the term "aliphatic" refers to an open-chain carbon-containing moiety, such as alkyl, alkenyl and alkynyl moieties, which may be linear or branched. Also as used herein, the term "alicyclic" refers to a cyclic aliphatic moiety, such as cycloalkyl and cycloalkenyl. Such alicyclic moieties are non-aromatic, but may include one or more carbon-carbon double bonds. "Halo" refers to fluoro, chloro, bromo, and iodo. The term "(meth)acrylate" refers to both methacrylate and acrylate, and likewise the term (meth)acrylamide refers to both methacrylamide and acrylamide. Unless the context clearly indicates otherwise, by "substituted" alkyl, alkenyl, or alkynyl is meant that one or more hydrogens on the alkyl, alkenyl, or alkynyl is replaced with one or more substituents chosen from halo, hydroxy, $C_{1-10}$ alkoxy, amino, mono- or di-$C_{1-10}$ hydrocarbyl substituted amino, $C_{5-20}$ aryl, and substituted $C_{5-20}$ aryl. Unless the context clearly indicates otherwise, by "substituted" aryl is meant that one or more hydrogens on the aryl is replaced by one or more substituents chosen from halo, hydroxy, $C_{1-10}$ alkyl, $C_{2-10}$ alkenyl, $C_{2-10}$ alkynyl, $C_{1-10}$ alkoxy, amino, mono- or di-$C_{1-10}$ hydrocarbyl substituted amino, $C_{5-20}$ aryl, and substituted $C_{5-20}$ aryl. "Alkyl" refers to an alkane radical, and includes alkane diradicals (alkylene) and higher-radicals. Likewise, the terms "alkenyl", "alkynyl" and "aryl" refer to the corresponding mono-, di- or higher-radicals of an alkene, alkyne and arene, respectively.

By the term "curing" is meant any process, such as polymerization or condensation, that increases the molecular weight of a material or composition. "Curable" refers to any material capable of being cured under certain conditions. The term "polymer" also includes oligomers. The term "oligomer" refers to relatively low molecular weight materials such as dimers, trimers, tetramers, pentamers, hexamers, and the like, including B-staged material, that are capable of further curing. As used herein, "aromatic organic residue" embraces an organic residue that has only aromatic character, such as phenyl, as well as an organic residue that contains a combination of aromatic and aliphatic moieties. The articles "a", "an" and "the" refer to the singular and the plural. All amounts are percent by weight and all ratios are molar ratios, unless otherwise noted. All numerical ranges are inclusive of the endpoints and combinable in any order, except where it is clear that such numerical ranges are constrained to add up to 100%.

The inventors have found certain arylcyclobutene polymers comprising as polymerized units one or more first arylcyclobutene monomers and one or more second monomers, the second monomers having two or more dienophilic moieties and one or more acid moieties chosen from carboxylic acid, protected carboxylic acid, and sulfonic acid, have improved tensile strength and elongation and/or improved aqueous base developability as compared to conventional arylcyclobutene-based polymers. Preferably, the present arylcyclobutene polymers are oligomeric.

Arylcyclobutene first monomers useful in preparing the present arylcyclobutene polymers include, but are not limited to, those having formula (1):

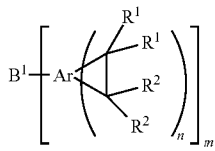

(1)

wherein $B^1$ is an m-valent linking group; Ar is a polyvalent aryl group and the carbon atoms of the cyclobutene ring are bonded to adjacent carbon atoms on the same aromatic ring of Ar; m is an integer of 1 or more; n is an integer of 1 or more; each of $R^1$ and $R^2$ is independently a monovalent group; the two $R^1$ moieties may be taken together along with the carbon to which they are attached to form a carbonyl or thiocarbonyl; and the two $R^2$ moieties may be taken together along with the carbon to which they are attached to form a carbonyl or thiocarbonyl. Preferably, the polyvalent aryl group, Ar, may be composed of 1 to 3 aromatic carbocyclic or heteroaromatic rings. It is preferred that the aryl group comprises a single aromatic ring, and more preferably a phenyl ring. When Ar is a phenyl ring, the monomer is a benzocyclobutene (BCB) monomer. The aryl group is optionally substituted with 1 to 3 groups chosen from $C_{1-6}$ alkyl, tri-$C_{1-6}$-alkylsilyl, $C_{1-6}$ alkoxy, halo, and carboxyl, preferably with one or more of $C_{1-6}$ alkyl, tri-$C_{1-3}$-alkylsilyl, $C_{1-3}$ alkoxy, chloro, bromo, fluoro, and carboxyl, and more preferably with one or more of $C_{1-3}$ alkyl, tri-$C_{1-3}$-alkylsilyl, $C_{1-3}$ alkoxy, and carboxyl. It is preferred that the aryl group is unsubstituted or substituted with carboxyl. It is preferred that n=1 or 2, and more preferably n=1. It is preferred that m=1-4, more preferably m=2-4, and yet more preferably m=2. Preferably, each $R^1$ and $R^2$ is independently chosen from H, $C_{1-6}$ alkyl, $C_{1-6}$ alkenyl, $C_{1-6}$ alkoxy, carboxy, $C_{2-6}$ carboxy-containing moiety, $C_{2-6}$ keto-containing moiety, $C_{1-6}$ amido-containing moiety, $C_{2-6}$ alkoxyalkanol, $C_{2-6}$ alkoxyester, and halo, and more preferably from H, $C_{1-3}$ alkyl, and $C_{1-3}$ alkoxy and halo. Suitable single valent $B^1$ groups preferably have the formula $-[C(R^3)_2-C(R^4)_2]_xZ^1$ or $[C(R^3)=CR^4]_xZ^1$, wherein each $R^3$ and $R^4$ are independently chosen from hydrogen, $C_{1-6}$ alkyl, and aryl; Z is chosen from hydrogen, $C_{1-6}$ alkyl, $C_{6-10}$ aryl, siloxaryl, siloxyalkyl, $-CO_2R^5$; each $R^5$ is independently chosen from H, $C_{1-6}$ alkyl, $C_{1-6}$ hydroxyalkyl, $C_{6-10}$ aryl, $C_{6-10}$ hydroxyaryl, $C_{7-20}$ aralkyl, $C_{7-20}$ hydroxyaralkyl, and $C_{7-20}$ alkaryl; and x=1 or 2. Preferably, $R^3$ and $R^4$ are independently chosen from H, $C_{1-3}$ alkyl, and aryl, and more preferably H and $C_{1-3}$ alkyl. It is preferred that $R^5$ is H, $C_{1-3}$ alkyl, $C_{1-6}$ hydroxyalkyl, $C_{6-10}$ aryl, $C_{6-10}$ hydroxyaryl, and $C_{7-20}$ hydroxyaralkyl. $Z^1$ is preferably siloxyl or $CO_2R^5$. Preferred siloxyl groups have the formula $-[Si(R^6)_2-O]$p-$Si(R^6)_2$—, wherein each $R^6$ is independently chosen from H, $C_{1-6}$ alkyl, aryl, aralkyl, and alkaryl; and p is an integer from 1 or more. It is preferred that $R^6$ is chosen from $C_{1-3}$ alkyl, $C_{6-10}$ aryl, and $C_{7-20}$ aralkyl. Suitable aralkyl groups include benzyl, phenethyl and phenylpropyl. Preferably, $B^1$ comprises one or more carbon-carbon double bonds (ethylenic unsaturation).

Preferably, the arylcyclobutene polymers comprise as polymerized units one or more bis-benzocyclobutene monomers of formula (2):

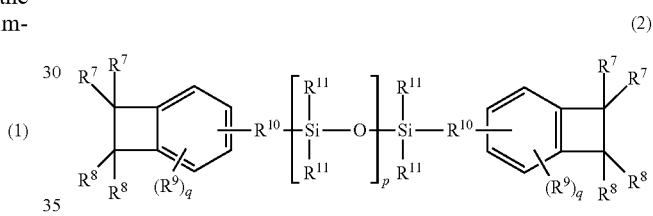

(2)

wherein each $R^7$ and $R^8$ is independently chosen from H, $C_{1-6}$ alkyl, $C_{1-6}$ alkenyl, $C_{1-6}$ alkoxy, halo, carboxy, $C_{2-6}$ carboxy-containing moiety, $C_{2-6}$ keto-containing moiety, $C_{1-6}$ amido-containing moiety, $C_{2-6}$ alkoxyalkanol, $C_{2-6}$ alkoxyester, $-O-C_{1-20}$ alkyl, $-(C=O)-C_{1-20}$ alkyl, $-O-(C=O)-C_{1-20}$ alkyl, $-(C=O)-O-C_{1-20}$ alkyl, $-O-C_{6-20}$ aryl, $-(C=O)-C_{6-20}$ aryl, $-O-(C=O)-C_{6-20}$ aryl, and $-(C=O)-O-C_{6-20}$ aryl, and preferably from H, $C_{1-3}$ alkyl, $C_{1-3}$ alkoxy and halo; wherein the two $R^7$ moieties may be taken together along with the carbon to which they are attached to form a carbonyl or thiocarbonyl; and wherein the two $R^8$ moieties may be taken together along with the carbon to which they are attached to form a carbonyl or thiocarbonyl; each $R^9$ is independently chosen from $C_{1-6}$ alkyl, tri-$C_{1-6}$-alkylsilyl, $C_{1-6}$ alkoxy, and halo; each $R^{10}$ is independently a divalent organic group which may be saturated or ethylenically unsaturated; each $R^{11}$ is independently chosen from H, $C_{1-6}$ alkyl, $C_{7-20}$ aralkyl and phenyl; p is an integer from 1 or more; and q is an integer from 0 to 3. Each $R^7$ and $R^8$ is preferably independently chosen from H, $C_{1-3}$ alkyl, and $C_{1-3}$ alkoxy, and more preferably each $R^7$ and $R^8$ is H. It is preferred that each $R^9$ is independently chosen from $C_{1-6}$ alkyl, tri-$C_{1-3}$-alkylsilyl, $C_{1-3}$ alkoxy, and chloro, and more preferably from $C_{1-3}$ alkyl, tri-$C_{1-3}$-alkylsilyl, and $C_{1-3}$ alkoxy. Preferably, each $R^{10}$ is independently chosen from $C_{2-6}$ alkyl, $C_{2-6}$ alkenyl, and $C_{2-6}$ alkynyl, and more preferably each $R^{11}$ is independently chosen from $-CH_2CH_2-$, $-CH=CH-$, and Each $R^{11}$ is preferably chosen from $C_{1-3}$ alkyl, and more preferably each $R^{11}$ is methyl. Preferably, p=1-5, more preferably p=1-3, and yet more preferably p=1. It is preferred that q=0.

A particularly preferred arylcyclobutene monomer of formula (2) is 1,3-bis(2-bicyclo[4.2.0]octa-1,3,5-trien-3-yl-ethenyl)-1,1,3,3-tetramethyldisiloxane (DVS-bisBCB), which has the formula (3).

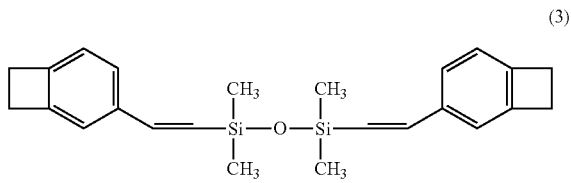 [SMILES: C[Si](C)(C=Cc1ccc2c(c1)CC2)O[Si](C)(C)C=Cc1ccc2c(c1)CC2]

(3)

The present arylcyclobutene polymers preferably comprise as polymerized units one or more benzocyclobutene monomers of formula (4):

(4)

wherein each $R^{12}$ and $R^{13}$ is independently chosen from H, $C_{1-6}$ alkyl, $C_{1-6}$ alkenyl, $C_{1-6}$ alkoxy, halo, carboxy, $C_{2-6}$ carboxy-containing moiety, $C_{2-6}$ keto-containing moiety, $C_{1-6}$ amido-containing moiety, $C_{2-6}$ alkoxyalkanol, $C_{2-6}$ alkoxyester, —O—$C_{1-20}$ alkyl, —(C=O)—$C_{1-20}$ alkyl, —O—(C=O)—$C_{1-20}$ alkyl, —(C=O)—O—$C_{1-20}$ alkyl, —O—$C_{6-20}$ aryl, —(C=O)—$C_{6-20}$ aryl, —O—(C=O)—$C_{6-20}$ aryl, and —(C=O)—O—$C_{6-20}$ aryl, and preferably from H, $C_{1-3}$ alkyl, and $C_{1-3}$ alkoxy; wherein the two $R^{12}$ moieties may be taken together along with the carbon to which they are attached to form a carbonyl or thiocarbonyl; and wherein the two $R^{13}$ moieties may be taken together along with the carbon to which they are attached to form a carbonyl or thiocarbonyl; each $R^{14}$ is independently chosen from $C_{1-6}$ alkyl, tri-$C_{1-6}$-alkylsilyl, $C_{1-6}$ alkoxy, and halo; Y is —$SO_3R^{15}$ or a monovalent radical having from 3 to 15 carbon atoms and having at least one —OH moiety or a protected carboxyl moiety; $R^{15}$ is H or a monovalent radical having from 1 to 20 carbon atoms; and f is an integer of from 0 to 2. Each $R^{12}$ and $R^{13}$ is preferably independently chosen from H, $C_{1-3}$ alkyl, $C_{1-3}$ alkoxy and halo, and more preferably each $R^{12}$ and $R^{13}$ is H. Preferably, each $R^{14}$ is independently chosen from $C_{1-6}$ alkyl, tri-$C_{1-3}$-alkylsilyl, $C_{1-3}$ alkoxy, and chloro, and more preferably from $C_{1-3}$ alkyl, tri-$C_{1-3}$-alkylsilyl, and $C_{1-3}$ alkoxy. The monovalent radical of Y may be aliphatic and/or aromatic. Typically, Y has from 1 to 5 —OH moieties, preferably from 1 to 3, more preferably 1 or 2, and yet more preferably 1 —OH moiety. Y may be a saturated or unsaturated monovalent radical having from 3 to 15 carbon atoms and having at least one —OH moiety, and is preferably ethylenically unsaturated. More preferably, the at least one —OH moiety of Y is —$CO_2H$ or —$SO_3H$. It is preferred that $R^{15}$ is H, a $C_{1-10}$ alkyl, $C_{7-16}$ aralkyl, or $C_{6-12}$ aryl. Preferred compounds of formula (4) are those wherein Y is chosen from —CH=CHC(=O)$OR^{16}$; —CH=CH—$CH_2OH$; —$CH_2$—CH=CHC$_6H_4OH$; and —CH=CHCH$_2C_6H_4OH$; wherein $R^{16}$ is chosen from H, $C_{2-8}$ hydroxyalkyl, and $C_{4-8}$ alkyl having one or more quaternary carbons directly bonded to the oxygen of the carboxyl moiety. More preferred are compounds of formula (4) are those wherein Y is —CH=CHC(=O)$OR^{16}$, and yet more preferably —CH=CHC(=O)OH. It is preferred that f=0.

The present arylcyclobutene polymers may comprise as polymerized units one arylcyclobutene monomer or more than one arylcyclobutene monomers. Preferably, the present polymers comprise as polymerized units two distinct arylcyclobutene first monomers. It is preferred that the present arylcyclobutene polymer comprises as polymerized units one or more arylcyclobutene first monomers comprising one or more moieties chosen from carboxylic acid, protected carboxylic acid and sulfonic acid. It is further preferred that the present arylcyclobutene polymers comprise as polymerized units one or more bis-benzocyclobutene monomers of formula (2) and one or more monomers of formula (4), and more preferably the monomer of formula (3) and one or more monomers of formula (4).

The one or more second monomers useful in preparing the present arylcyclobutene polymers are any which have two or more dienophilic moieties and one or more acid moieties chosen from carboxylic acid, protected carboxylic acid, and sulfonic acid. The dienophilic moieties are any which are capable of reacting with a diene under Diels-Alder reaction conditions. Suitable dienophilic moieties comprise ethylenic unsaturation (double bond) and/or acetylenic unsaturation (triple bond), and preferably the dienophilic moieties comprise one or more ethylenically unsaturated carbon-carbon bonds (C=C) and/or acetylenically unsaturated carbon-carbon bonds (CC). It is preferred that at least one dienophilic moiety is ethylenically unsaturated, and more preferably two or more dienophilic moieties in the second monomer are ethylenically unsaturated. Preferably, the second monomers have from 2 to 6, more preferably 2 to 5, and still more preferably 2 to 4 dienophilic moieties. Preferably, the present arylcyclobutene polymers comprise as polymerized units one second monomer. Alternately, it is preferred that present arylcyclobutene polymers comprise two or more distinct second monomers as polymerized units to tailor the desired physical properties, such as tensile strength, elongation and aqueous base developability, of the polymer. The second monomers useful in the present invention are preferably free of arylcyclobutene moieties, and more preferably free of benzocyclobutene moieties. It will be appreciated by those skilled in the art that suitable second monomers may have one or more moieties bonded to an ethylenically and/or acetylenically unsaturated carbon (dienophilic carbon) that promotes or retards Diels-Alder reactions. In this way, a second monomer having, for example, one or more dienophilic moieties having a dienophilic carbon having a Diels-Alder promoting moiety may undergo reaction at that dienophilic moiety prior to a second dienophilic moiety in such second monomer which lacks such promoting moiety. Accordingly, such second monomer may have both dienophilic moieties having relatively higher reactivity and dienophilic moieties having relatively lower reactivity, allowing the arylcyclobutene polymer to be further tailored to provide desired properties.

Preferably, the one or more second monomers have structures of formula (5)

$$(A)_p\text{-}Z\text{-}(E)_q \qquad (5)$$

wherein each A is independently an organic residue having from 1 to 20 carbon atoms and one or more moieties chosen from carboxylic acid, protected carboxylic acid and sulfonic acid; each E is independently an organic residue having from 2 to 20 carbon atoms and one or more dienophilic moieties;

Z is a chemical bond or an organic residue having from 1 to 30 carbon atoms; p is an integer from 1 to 6; and q is an integer from 2 to 6. Preferably, p is an integer from 1 to 4, more preferably 1 to 3, still more preferably p is 1 or 2, and yet more preferably p is 1. It is preferred that q is an integer from 2 to 4, and more preferably from 2 to 3.

The organic residue of A in formula (5) may contain one or more heteroatoms. Suitable heteroatoms in the organic residue of A are oxygen, sulfur or nitrogen, preferably oxygen or sulfur, and more preferably oxygen. Each A is preferably independently an organic residue having from 1 to 10 carbon atoms and from 0 to 2 heteroatoms chosen from oxygen, sulfur and nitrogen. More preferably, each A is independently an organic residue having from 1 to 10 carbon atoms and from 0 to 2 oxygen atoms. The organic residue of A may be aliphatic, including cycloaliphatic, or aromatic. Aliphatic organic residues of A may be saturated or unsaturated, such as alkenyl, and may be linear, branched or cyclic, and preferably is linear or branched. Aromatic organic residues of A may have a single aromatic ring, such as phenyl, or a single heteroaromatic ring, or may have fused rings with at least one being aromatic, such as naphthyl or tetrahydronaphthyl. It is preferred that the aromatic organic residue of A is carbocyclic. Each A has one or more moieties chosen from carboxylic acid, protected carboxylic acid, and sulfonic acid, preferably carboxylic acid and sulfonic acid, and more preferably carboxylic acid. Suitable organic residues of A include, without limitation, $C_{1-20}$ alkylcarboxylic acid, $C_{3-20}$ alkenylcarboxylic acid, $C_{7-20}$ arylcarboxylic acid, $C_{8-20}$ arylalkylcarboxylic acid, $C_{9-20}$ arylalkenylcarboxylic acid, $C_{2-20}$ alkyldicarboxylic acid, $C_{3-20}$ alkyltricarboxylic acid, sulfonic acid, $C_{1-20}$ alkylsulfonic acid, and $C_{2-20}$ alkenylsulfonic acid. Each of the $C_{1-20}$ alkylcarboxylic acid, $C_{3-20}$ alkenylcarboxylic acid, $C_{7-20}$ arylcarboxylic acid, $C_{8-20}$ arylalkylcarboxylic acid, $C_{9-20}$ arylalkenylcarboxylic acid, $C_{2-20}$ alkyldicarboxylic acid, and $C_{3-20}$ alkyltricarboxylic acid residues of A may further contain one or more heteroatoms, preferably contains one or more oxygen atoms, and more preferably contains one or more of carbonyl (—C(O)—) and carbonyloxy (—C(O)—O—) moieties. Preferably, each A is an organic residue formed from the reaction of a hydroxyl moiety of Z or E with a cyclic anhydride or a cyclic sultone, such as succinic anhydride, methylsuccinic anhydride, dimethylsuccinic anhydride, maleic anhydride, glutaric anhydride, diglycolic anhydride, 3-methylglutaric anhydride, 3,3-dimethylglutaric anhydride, itaconic anhydride, citraconic anhydride, phthalic anhydride, benzenetetracarboxylic acid anhydride, 1,8-naphthylic anhydride, 1,3-propane sultone, 1,4-butane sultone, prop-1-ene-1,3-sultone, α-hydroxy-ortho-toluenesultone, 3-fluoro-1,3-propane sultone, and 3,3,4,4-tetrafluoro-1,4-sultone.

Protected carboxylic acid (carboxyl) groups of A in formula (5) are any group which is cleavable under certain conditions to yield a carboxyl group. Such protected carboxyl groups may be cleaved by heat, acid, base or a combination thereof, preferably by heat, acid or a combination thereof, and more preferably by heat. Exemplary protected carboxyl groups include esters, such as benzyl esters and esters having a quaternary carbon bonded directly to the alkoxy oxygen of the ester group. It is preferred that the protected carboxyl group is an ester having a quaternary carbon bonded directly to the alkoxy oxygen of the ester group, and more preferably the ester has the formula Q-C(O)—O—CR'R''R''', where Q is an organic residue, and each of R', R'' and R''' are independently chosen from $C_{1-20}$ alkyl. Preferred protected carboxyl groups include: tert-butyl esters; 1-alkylcyclopentyl esters such as 1-methylcyclopentyl esters and 1-ethylcyclopentyl esters; 2,3-dimethyl-2-butyl esters; 3-methyl-3-pentyl esters; 2,3,3-trimethyl-3-butyl esters; 1,2-dimethylcyclopentyl esters; 2,3,4-trimethyl-3-pentyl esters; 2,2,3,4,4-pentamethyl-3-pentyl esters; and adamantyl esters such as hydroxyadamantyl esters and $C_{1-12}$ alkyladamantyl esters. Each of the aforementioned protected carboxyl groups can be cleaved by one or more of heat, acid or base. Preferably, the protected carboxyl groups are cleaved using heat, acid or a combination of heat and acid, and more preferably by heat. For example, these protected carboxyl groups can be cleaved using a photo- or thermally-generated strong acid such as perfluoroalkyl sulfonic acid, p-toluene sulfonic acid, or methanesulfonic acid. Such protected carboxyl groups may be cleaved at room temperature, but are typically heated to approximately 90 to 110° C., and preferably to approximately 100° C. Alternatively, when the protected carboxyl group is an ester having a quaternary carbon bonded directly to the alkoxy oxygen of the ester group, it can be cleaved by heating to a suitable temperature, such as ≥125° C., preferably from 125 to 250° C., and more preferably from 150 to 250° C. Such protected carboxyl groups, and their conditions of use, are well-known in the art, such as U.S. Pat. No. 6,136,501, which discloses various ester groups having a quaternary carbon bonded directly to the alkoxy oxygen of the ester group.

The organic residue of E in formula (5) may contain one or more heteroatoms. Suitable heteroatoms in the organic residue of E are oxygen, sulfur or nitrogen, preferably oxygen or sulfur, and more preferably oxygen. Each E is preferably independently an organic residue having from 2 to 16 carbon atoms and from 0 to 2 heteroatoms chosen from oxygen, sulfur and nitrogen. More preferably, each E is independently an organic residue having from 2 to 16 carbon atoms and from 0 to 2 oxygen atoms. The organic residue of E may be aliphatic, including cycloaliphatic, or aromatic, and is preferably aliphatic. Aliphatic organic residues of E may be saturated or unsaturated, such as alkenyl, and may be linear, branched or cyclic, and preferably is linear or branched. Aromatic organic residues of E may have a single aromatic ring, such as phenyl, or a single heteroaromatic ring, or may have fused rings with at least one being aromatic, such as naphthyl or tetrahydronaphthyl. Preferably, the aromatic organic residue of E is carbocyclic. The organic residue of E comprises one or more ethylenically unsaturated moieties and/or acetylenically unsaturated moieties. Preferably, the organic residue of E comprises one or more ethylenically unsaturated moieties. It is further preferred that the ethylenic and/or acetylenic unsaturation in E be terminal unsaturation. It is also preferred that each E is the same. Suitable organic residues of E include, but are no limited to, $C_{2-20}$ alkenyl, $C_{2-20}$ alkynyl, $C_{2-20}$ alkenyloxy, $C_{3-20}$ alkenyloxyalkyl, $C_{8-20}$ alkenylaryl, $C_{2-20}$ alkynyloxy. Preferably, E is chosen from $C_{2-20}$ alkenyl, $C_{3-20}$ alkenyloxyalkyl, $C_{8-20}$ alkenylaryl, and $C_{2-20}$ alkenyloxy. Preferred second monomers are those wherein each E of formula (5) is chosen from $C_{2-10}$ alkenyloxy and $C_{2-10}$ alkenyl, and more preferably from allyloxy ($H_2C=CH—CH_2—O—$) and $C_{2-10}$ alkenyl. The alkenyl groups of E are preferably linear or branched.

The organic residue of Z in formula (5) may contain from 0 to 6 heteroatoms, such as oxygen, sulfur and nitrogen. Preferably, the organic residue of Z contains from 0 to 4 heteroatoms. Oxygen and sulfur are the preferred heteroatoms in the organic residue of Z, and oxygen is more preferred. The organic residue of Z may be aliphatic, including cycloaliphatic, or aromatic. It is preferred that the organic residue of Z is a chemical bond or an organic residue having from 1 to 25 carbon atoms and from 0 to 6 heteroatoms chosen from oxygen, sulfur and nitrogen. More preferably, Z is a chemical bond or an organic residue having from 1 to 25 carbon atoms and from 0 to 4 oxygen atoms. Z is preferably an organic residue formed from a $C_{4-25}$ hydrocarbyl moiety having two or more anhydride moieties or hydroxyl substituents, and more preferably Z is an organic residue formed from a $C_{4-25}$ hydrocarbyl moiety having two to 4 anhydride moieties or hydroxyl substituents. It is preferred that Z is a residue formed from trimethylolpropane, pentaerythritol, benzenetetracarboxylic acid anhydride, 4,4'-(propane-2,2-diyl)bis(2-(but-3-en-1-yl)phenol), benzene-1,2,4-tricarboxylic 1,2-anhydride 4-chloride, 4,4'-(propane-2,2-diyl)bis(2-(but-3-en-1-yl)phenol), and protected phenols such as 4,4'-(propane-2,2-diyl)bis(2-(but-3-en-1-yl)phenylene acetate).

Preferred second monomers are those of formulae (6)-(9):

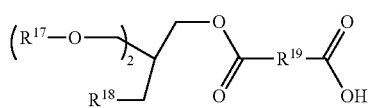
(6)

wherein each $R^{17}$ is independently chosen from $C_{3-10}$ alkenyl; $R^{18}$ is chosen from $C_{1-10}$ alkyl, $C_{3-10}$ alkenyl, and $—OR^{15}$; and $R^{19}$ is chosen from $C_{2-10}$ alkyl and $C_{2-10}$ alkenyl;

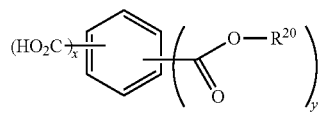
(7)

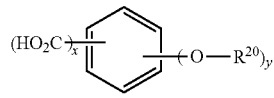
(8)

wherein each $R^{20}$ is independently chosen from $C_{3-10}$ alkenyl and $C_{1-10}$ alkyl-(O—$C_{3-10}$ alkenyl)$_z$; x and y are independently 1 or 2; and z is an integer of 1-3; provided that y=2 when $R^{20}$ is $C_{3-10}$ alkenyl; and

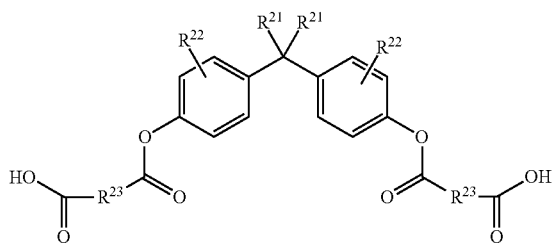
(9)

wherein each $R^{21}$ is independently chosen from H and $C_{1-10}$ alkyl; each $R^{22}$ is independently $C_{2-20}$ alkenyl, each $R^{23}$ is chosen from $C_{2-10}$ alkyl and $C_{2-10}$ alkenyl. It is preferred that $R^{17}$ is allyl. Preferably, $R^{18}$ is chosen from $C_{1-6}$ alkyl, $C_{3-6}$ alkenyl, and $—OR^{17}$, and more preferably $C_{1-3}$ alkyl, $C_{3-6}$ alkenyl, and $—O—CH_2—CH=CH_2$. $R^{19}$ is preferably $C_{2-6}$ alkyl and $C_{2-6}$ alkenyl, and more preferably chosen from ethylene ($—CH_2—CH_2—$), propylene ($—CH_2—CH_2—CH_2—$), ethenylene ($—CH=CH—$), and propenyl ($—CH_2—CH=CH—$). Preferably, each $R^{20}$ is independently chosen from $C_{3-10}$ alkenyl and $—CH_2C(CH_2—O—CH_2CH=CH_2)_2(R^{24})$. It is preferred that z=2 or 3. $R^{24}$ is preferably chosen from $C_{1-10}$ alkyl and $—CH_2—O—CH_2CH=CH_2$. It is preferred that each $R^{21}$ is independently chosen from H and $C_{1-6}$ alkyl, and more preferably each $R^{21}$ is independently methyl or ethyl. Each $R^{22}$ is preferably independently chosen from $C_{2-12}$ alkenyl, more preferably each $R^{22}$ is $C_{2-6}$ alkenyl, and yet more preferably each $R^{22}$ is independently chosen from vinyl, allyl, n-butenyl, isobutenyl, n-pentenyl, and isopentenyl.

The one or more second monomers of the invention may be prepared by a variety of methods known in the art. For example, benzenetetracarboxylic acid anhydride may be reacted with 2 equivalents of allyl magnesium bromide in a suitable solvent to afford the monomer of formula (7) where each of x and y=2, and $R^{20}$ is allyl. Alternatively, second monomers of formula (6) where $R^{17}$ is allyl, $R^{18}$ is $—O—CH_2—CH=CH_2$, and $R^{19}$ is $—CH_2CH_2—$ may be prepared by reacting timethylolpropane tri-allyl ether with 1 equivalent of succinic anhydride.

The present arylcyclobutene polymers may optionally further comprise as polymerized units one or more third monomers comprising one or more diene or dienophilic moieties. Such third monomers are different from the first and second monomers. Third monomers comprising one dienophilic moiety may be used to cap a growing arylcyclobutene polymer chain, effectively reducing the molecular weight relative to an arylcyclobutene polymer prepared in the absence of such third monomer. Third monomers comprising two or more dienophilic moieties may be used to impart other characteristics into the arylcyclobutene polymer. The selection of such third monomers is within the ability of those skilled in the art.

The ratio of the total moles of arylcyclobutene first monomers to the total moles of second monomers used to form the present polymers may vary from 99:1 to 1:99, preferably from 99:1 to 50:50, and more preferably from 90:10 to 60:40. The optional third monomers may be used in an amount of from 0 to 40 mol %, preferably from 0 to 30 mol %, and more preferably from 1 to 20 mol %, based on the total moles of monomers used to form the present arylcyclobutene polymers. Typically, the present arylcyclobutene polymers have a weight average molecular weight ($M_w$) of from 1000 to 50,000 AMU, and preferably from 1500 to 35,000 AMU, 2,500-25,000, as determined by gel permeation chromatography using polystyrene standards.

Arylcyclobutene polymers of the invention may be prepared by any suitable means, such as those described in U.S. Pat. Nos. 4,812,588; 5,136,069; 5,138,081; and Int. Pat. App. No. WO 94/25903. In general, the present polymers are prepared by heating one or more of the present arylcyclobutene first monomers and one or more second monomers, and any optional third monomers, typically in a suitable solvent, to the polymerization initiation temperature of the particular monomer(s) used. While not wishing to be bound by theory, it is believed that these monomers polymerize by a Diels-Alder cycloaddition, so no catalyst initiator or curing agents are necessary for the polymerization to occur. Typically, polymerization of these monomers is initiated at a temperature of ≥150° C., and preferably ≥170° C., although lower or higher temperatures may be used depending upon the particular monomer(s) selected. The temperature at which the present monomers undergo polymerization is affected by any substituent on the cyclobutene ring. In general, when the cyclobutene ring is unsubstituted, the polymerization is initiated at ≥170° C. Electron-donating or electron-withdrawing substituents on the cyclobutene ring generally lower the polymerization initiation temperature. Suitable polymerization solvents are any organic solvents which dissolve the one or more monomers and have boiling points above the polymerization temperature of the monomers. Exemplary organic solvents include polar aprotic solvents such as amides and sulfones. Polymerization time is typically from 1 to 60 hours. For certain applications, it may be desired to stop the polymerization at the oligomer stage. Such oligomers composed of one or more monomers of the invention may be composed predominantly of dimers, trimmers, tetramers, and the like, and may then be subsequently further polymerized. As used herein, the terms "monomers of the invention" and "present monomers" are intended to include the individual compounds described herein, as well as dimers, trimmers and tetramers thereof which are then to be further polymerized. The present polymers may be used as is or may be isolated by adding a non-solvent, such as water or methanol, to precipitate the polymer from the solution and thereafter removing the organic solvent.

Compositions of the present polymers typically comprise one or more arylcyclobutene polymers of the invention and one or more organic solvents. Suitable organic solvents are those in which the present polymers are soluble. Particularly useful organic solvents are any solvents useful in the manufacture or formulation of arylcyclobutene polymers. Exemplary organic solvents include, without limitation: aromatic hydrocarbons such as toluene, xylene, and mesitylene; alcohols such as 2-methyl-1-butanol, 4-methyl-2-pentanol, and methyl isobutyl carbinol; esters such as ethyl lactate, propylene glycol methyl ether acetate, methyl 2-hydroxyisobutyrate, methyl 3-methoxypropionate and 3-methoxy-1-butyl acetate; lactones such as gamma-butyrolac tone; lactams such as N-methylpyrrolidinone; ethers such as propylene glycol methyl ether and dipropylene glycol dimethyl ether isomers (commercially available from The Dow Chemical Company as PROGLYDE™ DMM); ketones such as cyclohexanone and methylcyclohexanone; and mixtures thereof.

Suitable optional additives useful in the present compositions include, without limitation, one or more of each of curing agents, surfactants, crosslinkers different from the present monomers, inorganic fillers, organic fillers, plasticizers, adhesion promoters, metal passivating materials, and the like, and combinations of any of the foregoing. Suitable surfactants are well-known to those skilled in the art, and nonionic surfactants are preferred. Such surfactants may be present in an amount of from 0 to 10 g/L, and preferably from 0 to 5 g/L. Any suitable inorganic fillers may optionally be used in the present compositions, and are well-known to those skilled in the art. Exemplary inorganic fillers include, but are not limited to, silica, silicon carbide, silicon nitride, alumina, aluminum carbide, aluminum nitride, zirconia, and the like, and mixtures thereof. The inorganic filler may be in the form of a powder, rods, spheres, or any other suitable shape. Such inorganic filler may have any suitable dimensions. Inorganic filler may be used in an amount of from 0 to 80 wt %, based on the total weight of the composition. Any crosslinking monomers that are different from the monomers of the invention may be used as crosslinkers, provided that they crosslink with the arylcyclobutene polymer in the composition under the conditions used to cure the composition. Suitable crosslinkers include, but are not limited to, polyamines, polythiols, and (meth)acrylate-containing crosslinkers. The selection of such crosslinkers is within the ability of those skilled in the art. Such crosslinkers are typically used in an amount of from 0 to 20 wt %, and preferably 0 to 10 wt %, based on the total weight of the polymerizable components in the composition. One or more non-crosslinking monomers may also be added to the present compositions, and are typically present in an amount of from 0 to 20 wt %, based on the total weight of the polymerizable components in the composition. Such non-crosslinking monomers contain 1 or 2 polymerizable moieties capable of polymerizing with the benzocyclobutene-based components in the present compositions. Preferably, the metal passivating material is a copper passivating agent. Suitable copper passivating agents are well known in the art and include imidazoles and benzotriaoles.

A variety of curing agents may be used in the present compositions. Suitable curing agents may aid in the curing of the benzocyclobutene-based materials, and may be activated by heat or light. Exemplary curing agents include, but are not limited to, thermally generated initiators and photoactive compounds (photogenerated initiators). The selection of such curing agents is within the ability of those skilled in the art. Preferred thermal generated initiators are free radical initiators, such as, but not limited to, azobisisobutyronitrile, dibenzoyl peroxide, and dicumylperoxide. Preferred photoactive curing agents are free radical photoinitiators available from BASF under the Irgacure brand, and diazonaphthoquinone (DNQ) compounds including sulfonate esters of a DNQ compound. Suitable DNQ compounds are any compounds having a DNQ moiety, such as a DNQ sulfonate ester moiety, and that function as photoactive compounds in the present compositions, that is, they function as dissolution inhibitors upon exposure to appropriate radiation. Suitable DNQ compounds are disclosed in U.S. Pat. Nos. 7,198,878 and 8,143,360. The amount of photoactive compound varies from 0 to 30 wt %, based on the total weight of the arylcyclobutene polymers. When present, the photoactive component is typically used in an amount of 5 to 30 wt %, preferably from 5 to 25 wt %, and more preferably from 10 to 25 wt %, based on the total weight of the benzocyclobutene-based components.

Any suitable adhesion promoter may be used in the present compositions and the selection of such adhesion promoter is well within the ability of those skilled in the art. Preferred adhesion promoters are silane-containing materials, and more preferably trialkoxysilane-containing materials. Exemplary adhesion promoters include, but are not limited to: bis(trialkoxysilylalkyl)benzenes such as bis(t-rimethoxysilylethyl)benzene; aminoalkyl trialkoxy silanes such as aminopropyl trimethoxy silane, aminopropyl triethoxy silane, and phenyl aminopropyl triethoxy silane; and other silane coupling agents, as well as mixtures of the foregoing. Particularly suitable adhesion promoters include AP 3000, AP 8000, and AP 9000S, available from Dow Electronic Materials (Marlborough, Mass.). The present crosslinkable compositions typically contain from 0 to 15 wt % of an adhesion promoter based on the total weight of the composition, preferably from 0.5 to 10 wt %, more preferably from 1 to 10 wt %, yet more preferably from 2 to 10 wt %.

The present compositions are prepared by combining one or more present polymers and any optional organic solvents or additional components in any order. When the present compositions contain a curing agent such as a photoactive compound, it is preferred that the curing agent is first dissolved in a suitable organic solvent, then combined with one or more present polymers and any optional surfactant, and then combined with any optional adhesion promoter.

Any of the present compositions are useful in forming a layer of an arylcyclobutene polymer having improved tensile strength, elongation and/or aqueous base developability on a substrate. Such arylcyclobutene polymer layers are suitable as dielectric layers, permanent bonding adhesives, as stress buffer layers, and the like. The present compositions may be coated on a substrate by any suitable method. Suitable methods for disposing the present compositions include, but are not limited to, spin-coating, curtain coating, spray coating, roller coating, dip coating, vapor deposition, and lamination such as vacuum lamination, among other methods. In the semiconductor manufacturing industry, spin-coating is a preferred method to take advantage of existing equipment and processes. In spin-coating, the solids content of the composition may be adjusted, along with the spin speed, to achieve a desired thickness of the composition on the surface it is applied to. Typically, the present compositions are spin-coated at a spin speed of 400 to 4000 rpm. The amount of the present compositions dispensed on the wafer or substrate depends on the total solids content in the composition, the desired thickness of the resulting layer, and other factors well-known to those skilled in the art. When a film or layer of the present compositions is cast, such as by spin-coating, much (or all) of the solvent evaporates during deposition of the film. Preferably, after being disposed on a surface, the composition is heated (baked) to remove any remaining solvent. Typical baking temperatures are from 90 to 160° C., although other temperatures may be suitably used. Such baking to remove residual solvent is typically done for approximately 2 minutes, although longer or shorter times may suitably be used. The arylcyclobutene oligomers are typically cured by heating for a period of time. Suitable curing temperatures range from 180 to 250° C. or higher. Typically curing times range from 1 to 600 minutes.

In an alternate preferred method, the present compositions may be formed as a dry film and disposed on the surface of a substrate by lamination. A variety of suitable lamination techniques, including vacuum lamination techniques, may be used and are well known to those skilled in the art. In forming a dry film, the present compositions are first disposed, such as coated, onto a front surface of a suitable film support sheet such as a polyester sheet, preferably polyethyleneterephthalate (PET) sheet, or a polyimide sheet such as KAPTON™ polyimide, using slot-die coating, gravure printing, or another appropriate method. The composition is then soft baked at a suitable temperature, such as from 90 to 140° C., for an appropriate time, such as from 1 to 30 minutes, to remove any solvent. A polymer film cover sheet such as polyethylene is then roll-laminated at room temperature onto the dried composition to protect the composition during storage and handling. To dispose the dried composition onto the substrate, the cover sheet is first removed. Then, the dried composition on the support sheet is laminated onto the substrate surface using roll-lamination or vacuum lamination. The lamination temperature can range from 20 to 120° C. The support sheet is then removed (peeled), leaving the dried composition on that surface.

A wide variety of electronic device substrates may be employed in the present invention. An electronic device substrate is any substrate for use in the manufacture of any electronic device. Exemplary electronic device substrates include, without limitation, semiconductor wafers, glass, sapphire, silicate materials, silicon nitride materials, silicon carbide materials, display device substrates, epoxy mold compound wafers, circuit board substrates, and thermally stable polymers. As used herein, the term "semiconductor wafer" is intended to encompass a semiconductor substrate, a semiconductor device, and various packages for various levels of interconnection, including a single-chip wafer, multiple-chip wafer, packages for various levels, substrates for light emitting diodes (LEDs), or other assemblies requiring solder connections. Semiconductor wafers, such as silicon wafers, gallium-arsenide wafers, and silicon-germanium wafers, may be patterned or unpatterned. As used herein, the term "semiconductor substrate" includes any substrate having one or more semiconductor layers or structures which include active or operable portions of semiconductor devices. The term "semiconductor substrate" is defined to mean any construction comprising semiconductive material, such as a semiconductor device. A semiconductor device refers to a semiconductor substrate upon which at least one microelectronic device has been or is being fabricated. Thermally stable polymers include, without limitation, any polymer stable to the temperatures used to cure the arylcyclobutene material, such as polyimide (for example, KAPTON™ polyimide, available from DuPont, Wilmington, Del.).

When compositions of the invention which do not contain an adhesion promoter are used, the surface of the substrate to be coated with the present compositions may optionally first be contacted with a suitable adhesion promoter or vapor treated. Such treatments improve the adhesion of the present arylcyclobutene polymers to the substrate surface. Any suitable method, such as spin-coating, dip coating, spray coating, curtain coating, roll coating, vapor deposition, and the like, may be used to contact the substrate surface with the adhesion promoter. Spin-coating is a preferred method for contacting the substrate surface with an adhesion promoter. Any suitable adhesion promoter may be used and the selection of such adhesion promoter is well within the ability of those skilled in the art. Preferred adhesion promoters are silane-containing materials, and more preferably trialkoxysilane-containing materials. Exemplary adhesion promoters useful to pre-treat the substrate surface are those described above. Various vapor treatments known in the art may be used to increase the adhesion of the arylcyclobutene polymers of the present invention to the substrate surface, such as plasma treatments. In certain applications, it may be preferred to use an adhesion promoter to treat the substrate surface prior to coating the surface with the present compositions.

The present arylcyclobutene-based polymers are useful in forming arylcyclobutene-based coatings that have improved tensile strength, elongation and/or aqueous base developability as compared to coatings prepared from conventional benzocyclobutene-based polymers.

EXAMPLE 1: SYNTHESIS OF 4-(2,2-BIS((ALLYLOXY)METHYL)BUTOXY)-4-OXOBUTANOIC ACID (COMPOUND 6A)

A 500-mL 3-neck round bottom flask equipped with a condenser, nitrogen inlet, septa and a stir bar, was charged with trimethylolpropane diallyl ether (NEOALLYL T-20, 10.0 g, 46.9 mmol), succinic anhydride (11.7 g, 117 mmol) and toluene (120 mL). The mixture was stirred for five minutes before p-toluenesulfonic acid (0.085 g, 0.45 mmol) and hydroquinone (0.057 g, 0.49 mmol) were added to the stirred mixture. The reaction was heated to 70° C. for 18 hours and then cooled to room temperature. The mixture was filtered and the organic layer was then transferred to a separatory funnel. The organic layer was then washed five times with equal parts of water. The organic phase was dried over Na$_2$SO$_4$ and the solvent was removed under reduced pressure. The procedure above was repeated and the combined crude products were purified by chromatography over silica gel, eluting with ethyl acetate/hexanes, giving 20.3 g (49%) of the desired product, Compound 6a. $^1$H NMR (400 MHz, CDCl$_3$) δ 5.86 (ddt, J=17.2, 10.7, 5.4 Hz, 2H), 5.29-5.06 (m, 4H), 4.07 (s, 2H), 3.92 (d, J=5.5 Hz, 4), 3.31 (s, 4H), 2.78-2.52 (m, 4H), 1.43 (q, J=7.6 Hz, 2H), 0.84 (t, J=7.6 Hz, 3H). $^{13}$C NMR (101 MHz, CDCl$_3$) δ 178.08, 171.80, 134.95, 116.36, 77.30, 76.99, 76.67, 72.22, 70.22, 65.39, 42.28, 28.92, 28.89, 22.89, 7.49.

EXAMPLE 2: SYNTHESIS OF 4-(2,2-BIS((ALLYLOXY)METHYL)BUTOXY)-4-OXOBUTENOIC ACID (COMPOUND 6B)

A 500-mL 3-neck round bottom flask equipped with a condenser, nitrogen inlet, septa and a stir bar, was charged with trimethylolpropane diallyl ether (Neoallyl T-20, 50.0 g, 233 mmol), maleic anhydride (57.2 g, 583 mmol) and toluene (250 mL). The mixture was stirred for five minutes before p-toluenesulfonic acid (0.480 g, 2.52 mmol) and hydroquinone (0.240 g, 0.217 mmol) were added to the stirred mixture. The reaction was heated to 70° C. for 18 hours and then cooled to room temperature. The mixture was then filtered and the organic layer was then transferred to a separatory funnel. The organic layer was then washed five times with equal parts of water. The organic phase was dried over Na$_2$SO$_4$ and the solvent was removed under reduced pressure to give 58.3 g (80%) of Compound 6b as a clear viscous oil. $^1$H NMR (400 MHz, CDCl$_3$) δ 6.36 (q, J=12.7 Hz, 2H), 5.82 (ddt, J=17.1, 10.6, 5.4 Hz, 2H), 5.31-5.09 (m, 4H), 4.24 (s, 2H), 3.90 (dd, J=5.5, 1.5 Hz, 4H), 3.31 (s, 4H), 1.45 (q, J=7.6 Hz, 2H), 0.84 (t, J=7.5 Hz, 3H). $^{13}$C NMR (101 MHz, CDCl$_3$) δ 167.31, 165.15, 135.26, 134.69, 129.50, 116.63, 72.24, 70.04, 67.62, 42.31, 22.91, 7.47.

EXAMPLE 3: PREPARATION OF (Z)-4-(3-(ALLYLOXY)-2,2-BIS((ALLYLOXY)METHYL)-PROPOXY)-4-OXOBUT-2-ENOIC ACID (COMPOUND 6C)

A 1000 mL 3-neck round bottom flask equipped with a condenser, nitrogen inlet, septa and a stir bar, was charged with pentaerythritol triallyl ether (Neoallyl P-30, 20.01 g, 78.06 mmol), maleic anhydride (19.46 g, 198.4 mmol) and toluene (240 mL). The mixture was stirred for five minutes before p-toluenesulfonic acid (0.146 g, 0.768 mmol) and hydroquinone (0.103 g, 0.772 mmol) were added to the stirred mixture. The reaction was heated to 70° C. for 18 hours and then cooled to room temperature. The mixture was then filtered and the organic layer was then transferred to a separatory funnel. The organic layer was then washed five times with equal parts of water. The organic phase was dried over Na$_2$SO$_4$ and the solvent was removed under reduced pressure, giving 20.3 g (49%) of Compound 6c. $^1$H NMR (400 MHz, CDCl$_3$) δ 6.53-6.29 (m, 2H), 5.85 (ddt, J=17.3, 10.5, 5.4 Hz, 3H), 5.36-5.05 (m, 6H), 4.40 (s, 2H), 3.94 (dt, J=5.4, 1.5 Hz, 6H), 3.46 (s, 6H). $^{13}$C NMR (101 MHz, CDCl$_3$) δ 167.87, 163.80, 137.41, 134.58, 128.85, 116.68, 72.31, 68.94, 66.84, 44.46.

EXAMPLE 4: PREPARATION OF 4-(3-(ALLYLOXY)-2,2-BIS((ALLYLOXY)METHYL)PROPOXY)-4-OXOBUTANOIC ACID (COMPOUND 6D)

A 500 mL 3-neck round bottom flask with a bottom drain, equipped with a condenser, nitrogen inlet, septa and an overhead mechanical stirrer was charged with pentaerythritol triallyl ether (Neoallyl P-30, 50.0 g, 195 mmol), succinic anhydride (48.8 g, 487 mmol) and toluene (500 mL). The mixture was stirred for five minutes before p-toluenesulfonic acid (0.371 g, 1.95 mmol) and hydroquinone (0.214 g, 1.95 mmol) were added to the stirred mixture. The reaction was heated to 70° C. and stirred overnight. The following day the reaction mixture was allowed to cool to room temperature and water (250 mL) was added to the reaction with stirring. After stirring for 20 minutes, stirring was stopped and the layers were allowed to separate. The water layer was then remover via the bottom drain. This water wash was repeated five times. The reactor was equipped with a Dean-Stark tray heated to reflux to remove residual water. After drying, the mixture was cooled to room temperature and the solvent removed under reduced pressure to give 66.5 g (96%) of Compound 6d as viscous oil. $^1$H NMR (400 MHz, CDCl$_3$) δ 5.85 (m, 3H), 5.23 (dq, J=17.3, 1.8 Hz, 6H), 4.18 (s, 2H), 3.92 (dt, J=5.4, 1.6 Hz, 6H), 3.43 (s, 6H), 2.69-2.58 (m, 4H). $^{13}$C NMR (101 MHz, CDCl$_3$) δ 178.05, 171.71, 134.89, 116.36, 72.26, 68.97, 64.31, 44.45, 28.92.

EXAMPLE 5: PREPARATION OF ARYLCYCLOBUTENE POLYMER 1 (AP1)

In a nitrogen purged reaction vessel, a mixture of benzocyclobutene acrylic acid (BCB-AA) (12.02 g, 69.00 mmol), DVS-bisBCB (13.48 g, 34.50 mmol) and Compound 6a from Example 1 (3.615 g, 11.50 mmol) in 3-methoxybutylacetate (42 g) was heated to 175° C. for 24 hours. The temperature was then lowered to 165° C. and continued to react while monitoring for molecular weight build by periodically removing a small sample and measuring the M$_w$ of the resulting polymer by gel permeation chromatography (GPC) using polystyrene standards. When the observed M$_w$ was 5000-6500 atomic mass units (AMUs), the reactor was cooled 80° C. and the mixture was filtered hot though a 1 μm polypropylene filter over layered with a bed of celite. The resulting polymer of the invention (AP1) contained 10 mole % of Compound 6a.

EXAMPLE 6

The procedure of Example 5 was repeated except that the amounts of monomers were as follows: BCB-AA (10.02 g, 57.50 mmol), DVS-bisBCB (13.48 g, 34.5 mmol) as first monomers and Compound 6a from Example 1 (7.23 g, 23.0 mmol) as the second monomer in 3-methoxybutylacetate (44 g) were B-staged as before to provide Polymer AP2 of the invention containing 20 mol % of Compound 6a.

EXAMPLE 7

The procedure of Example 5 was repeated except that the amounts of monomers were as follows: BCB-AA (8.013 g, 46.00 mmol), DVS-bisBCB (13.48 g, 34.5 mmol) as first monomers and Compound 6a from Example 1 (10.85 g, 34.5 mmol) as the second monomer in 3-methoxybutylacetate (47 g) were B-staged as before to provide Polymer AP3 of the invention containing 30 mol % of Compound 6a.

EXAMPLE 8

The procedure of Example 5 was repeated except that the amounts of monomers were as follows: BCB-AA (12.02 g, 69.00 mmol), DVS-bisBCB (13.48 g, 34.5 mmol) as first monomers and Compound 6b from Example 2 (3.592 g, 11.5 mmol) as the second monomer in 3-methoxybutylacetate (42 g) were B-staged as before to provide Polymer AP4 of the invention containing 10 mol % of Compound 6b.

EXAMPLE 8

The procedure of Example 5 was repeated except that the amounts of monomers were as follows: BCB-AA (10.02 g, 57.5 mmol), DVS-bisBCB (13.48 g, 34.5 mmol) as first monomers and Compound 6b from Example 2 (7.18 g, 23.0 mmol) as the second monomer in 3-methoxybutylacetate (44 g) were B-staged as before to provide Polymer AP5 of the invention containing 20 mol % of Compound 6b.

EXAMPLE 9

The procedure of Example 5 was repeated except that the amounts of monomers were as follows: BCB-AA (8.01 g, 46.0 mmol), DVS-bisBCB (13.48 g, 34.5 mmol) as first monomers and Compound 6b from Example 2 (10.78 g, 34.5 mmol) as the second monomer in 3-methoxybutylacetate (44 g) were B-staged as before to provide Polymer AP6 of the invention containing 30 mol % of Compound 6b.

EXAMPLE 8

The procedure of Example 5 was repeated except that the amounts of monomers were as follows: BCB-AA (12.02 g, 69.00 mmol), DVS-bisBCB (13.48 g, 34.5 mmol) as first monomers and Compound 6c from Example 3 (3.592 g, 11.5 mmol) as the second monomer in 3-methoxybutylacetate (42 g) were B-staged as before to provide Polymer AP7 of the invention containing 10 mol % of Compound 6c.

EXAMPLE 9

The procedure of Example 5 was repeated except that the amounts of monomers were as follows: BCB-AA (10.02 g, 57.5 mmol), DVS-bisBCB (13.48 g, 34.5 mmol) as first monomers and Compound 6c from Example 3 (7.18 g, 23.0 mmol) as the second monomer in 3-methoxybutylacetate (44 g) were B-staged as before to provide Polymer AP8 of the invention containing 20 mol % of Compound 6c.

EXAMPLE 10

The procedure of Example 5 was repeated except that the amounts of monomers were as follows: BCB-AA (8.01 g, 46.00 mmol), DVS-bisBCB (13.48 g, 34.5 mmol) as first monomers and Compound 6c from Example 3 (10.78 g, 34.5 mmol) as the second monomer in 3-methoxybutylacetate (46 g) were B-staged as before to provide Polymer AP9 of the invention containing 30 mol % of Compound 6c.

EXAMPLE 11

The procedure of Example 5 was repeated except that the amounts of monomers were as follows: BCB-AA (12.02 g, 69.00 mmol), DVS-bisBCB (13.48 g, 34.5 mmol) as first monomers and Compound 6d from Example 4 (4.099 g, 11.5 mmol) as the second monomer in 3-methoxybutylacetate (43 g) were B-staged as before to provide Polymer AP10 of the invention containing 10 mol % of Compound 6d.

EXAMPLE 12

The procedure of Example 5 was repeated except that the amounts of monomers were as follows: BCB-AA (10.02 g, 57.5 mmol), DVS-bisBCB (13.48 g, 34.5 mmol) as first monomers and Compound 6d from Example 4 (8.197 g, 23.0 mmol) as the second monomer in 3-methoxybutylacetate (46 g) were B-staged as before to provide Polymer AP11 of the invention containing 20 mol % of Compound 6d.

EXAMPLE 13

The procedure of Example 5 was repeated except that the amounts of monomers were as follows: BCB-AA (8.013 g, 46.0 mmol), DVS-bisBCB (13.48 g, 34.5 mmol) as first monomers and Compound 6d from Example 4 (12.30 g, 34.5 mmol) as the second monomer in 3-methoxybutylacetate (49 g) were B-staged as before to provide Polymer AP12 of the invention containing 30 mol % of Compound 6d.

EXAMPLE 14. PREPARATION OF COATING COMPOSITION 1

In a bottle were combined 3.22 g of 2,1,5 diazonaphthoquinone sulfonic ester of 4,4'-((2-hydroxyphenyl)methylene)-bis(2,3,6-trimethylphenol) with an average 65 mole % of esterified phenols (as photoactive compound or PAC), 2.93 g propylene glycol methyl ether acetate (PGMEA), 1.60 g of 3-methoxybutylacetate, 1.76 g of Anisole, and 0.62 g of DCT L-7604 surfactant in PGMEA solvent. Next, 4.68 g of a 50 wt % solution N-540 epoxy cross-linker solution in PGMEA was added along with 12.5 g of a composition of 41 wt % AP1 from Example 5 in 3-methoxybutylacetate and 0.288 g of an adhesion promoter (50 wt % solution of triethoxysilylpropylmaleamic acid in PGMEA). The bottle was rolled for 12 hours to form a homogeneous solution. After de-foaming, the resulting Coating Composition 1 was filtered through a 0.45 μm nylon filter before use.

COMPARATIVE EXAMPLE 1

A conventional arylcyclobutene polymer (comparative polymer CP1) was prepared using BCB-AA and DVS-bisBCB in a mole ratio of 70:30 according to the general procedure of Example 3. A comparative coating composition was prepared according to the general procedure of Example 4 except that comparative polymer CP1 was used in place of arylcyclobutene polymer of the invention AP1.

EXAMPLE 15

The procedure of Example 5 was repeated using 10 mole % of Compound 6a to provide arylcyclobutene polymer AP2, and was repeated a second time using 30 mole % of Compound 6a to provide arylcyclobutene polymer AP3.

The procedure of Example 6 was repeated except that arylcyclobutene polymer AP2 was used to prepare Coating composition 2. The procedure of Example 6 was again repeated except that arylcyclobutene polymer AP3 was used instead of polymer AP1 to prepare Coating composition 3.

EXAMPLE 16

The general procedure of Example 5 is repeated except that the amounts of the BCB-monomers and the second monomer of the invention are varied. The amounts of the monomers are reported in Table 1 and are expected to provide polymers AP13 to AP18. The structures of compounds 7a to 7d are shown below. Structure 7d is a mixture of regioisomers.

TABLE 1

| Polymer | BCB-AA (mmol) | DVS-bisBCB (mmol) | Second Monomer (mmol) |
|---|---|---|---|
| AP13 | 70 | 35 | Compound 7a (31) |
| AP14 | 54 | 19 | Compound 7b (35) |
| AP15 | 48 | 30 | Compound 7c (21) |
| AP16 | 55 | 35 | Compound 7c (17) |
| AP17 | 35 | 45 | Compound 7d (12) |
| AP18 | 61 | 34 | Compound 7b (15) + Compound 7c (12) |

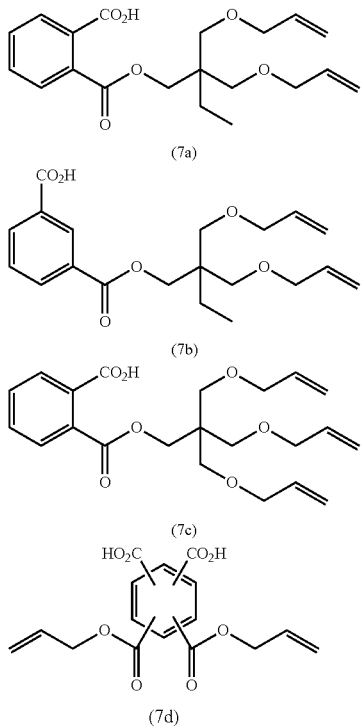

(7a)

(7b)

(7c)

(7d)

EXAMPLE 17

Each of Coating Compositions 1-3 and comparative coating composition of Comparative Example 1 were sputtered on 200 mm prime grade copper coated silicon wafers using a Site Trac TT5-XP coater at 1735 rpm for 30 seconds followed by a soft bake of 90° C. for 90 seconds to further remove solvent. The film thickness of each coating was approximately 5.5 μm. The coated wafers were then hard cured in a Blue M Ultra-Temp oven (Model IGF-6680E-4) under nitrogen at 250° C. for 60 minutes. The final film thickness was approximately 5 μm, and wafers were cleaved into 10 mm by 90 mm samples.

Each wafer was subjected to a 10% solution of ammonium persulfate in order to lift the polymer films off the wafer. The films were carefully rinsed with water and allowed to fully dry. Once dried, each sample was mounted on an elongation template with transparent tape with a 25.4 mm gauge length. Elongation measurements were taken on an Instron 33R4464 Model instrument using a crosshead speed of 5 mm/sec and Instron Bluehill2 software. Tensile strength values (MPa) were calculated by dividing the load at break by the original minimum cross-sectional area. The average tensile strength and % elongation of each sample is reported in Table 2. As can be seen from these results, the films formed from the arylcyclobutene polymers of the invention have improved elongation as compared to films formed from conventional arylcyclobutene polymers.

TABLE 2

| Polymer | Average Tensile Strength | Elongation % |
|---|---|---|
| CP1 | 104.8 | 10.7 |
| AP1 | 103.8 | 13.9 |
| AP2 | 99.8 | 17.3 |
| AP3 | 96.9 | 16.3 |
| AP5 | 98.58 | 19.83 |
| AP6 | 109.56 | 20 |
| AP7 | 112.07 | 18.89 |
| AP8 | 106.73 | 17.47 |
| AP9 | 102.95 | 16.03 |

What is claimed is:

1. A polymer comprising as polymerized units one or more arylcyclobutene first monomers and one or more second monomers having two or more dienophilic moieties and one or more acid moieties chosen from carboxylic acid, protected carboxylic acid, and sulfonic acid; wherein the protected carboxylic acid is an ester having a quaternary carbon bonded directly to the alkoxy oxygen of the ester group; and wherein the one or more second monomers are free of benzocyclobutene moieties.

2. The polymer of claim 1 wherein the one or more arylcyclobutene first monomers further comprises one or more moieties chosen from carboxylic acid, protected carboxylic acid and sulfonic acid; wherein the protected carboxylic acid is an ester having a quaternary carbon bonded directly to the alkoxy oxygen of the ester group.

3. The polymer of claim 1 further comprising two distinct arylcyclobutene first monomers.

4. The polymer of claim 1 wherein the dienophilic moieties are chosen from ethylenically unsaturated and acetylenically unsaturated carbon-carbon bonds.

5. The polymer of claim 1 further comprising as polymerized units one or more third monomers comprising one or more diene or dienophilic moieties.

6. The polymer of claim 1 wherein the one or more arylcyclobutene first monomers have the formula:

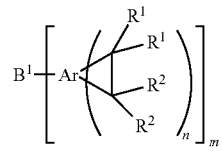

wherein $B^1$ is an m-valent linking group; Ar is a polyvalent aryl group and the carbon atoms of the cyclobutene ring are bonded to adjacent carbon atoms on the same aromatic ring of Ar; m is an integer of 1 or more; n is an integer of 1 or more; each of $R^1$ and $R^2$ is independently a monovalent group; the two $R^1$ moieties may be taken together along with the carbon to which they are attached to form a carbonyl or thiocarbonyl; and the two $R^2$ moieties may be taken together along with the carbon to which they are attached to form a carbonyl or thiocarbonyl.

7. The polymer of claim 1 wherein the one or more second monomers have the formula $(A)_p\text{-}Z(E)_q$ wherein each A is independently an organic residue having from 1 to 20 carbon atoms and a one or more moieties chosen from carboxylic acid, protected carboxylic acid and sulfonic acid; each E is independently an organic residue having from 2 to 20 carbon atoms and one or more dienophilic moieties; Z is a chemical bond or an organic residue having from 1 to 30 carbon atoms; p is an integer from 1 to 6; and q is an integer from 2 to 6; wherein the protected carboxylic acid is an ester having a quaternary carbon bonded directly to the alkoxy oxygen of the ester group.

8. The polymer of claim 7 wherein p is an integer from 1 to 4.

9. The polymer of claim 7 wherein q is an integer from 2 to 4.

10. A composition comprising the polymer of claim 1 and one or more organic solvents.

11. The composition of claim 10 further comprising one or more photoactive compounds.

12. A method of forming a film on a substrate comprising: providing a substrate; coating a layer of a composition of claim 10 on a surface of the substrate; and curing the coating.

13. The polymer of claim 1 wherein at least one second monomer is chosen from formulae (6) to (9):

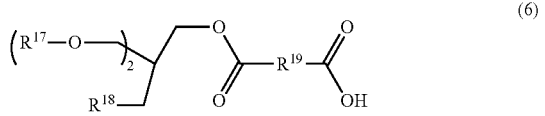
(6)

wherein each $R^{17}$ is independently chosen from $C_{3-10}$ alkenyl; $R^{18}$ is chosen from $C_{1-10}$ alkyl, $C_{3-10}$ alkenyl, and —$OR^{15}$; and $R^{19}$ is chosen from $C_{2-10}$ alkyl and $C_{2-10}$ alkenyl;

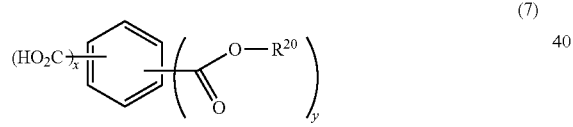
(7)

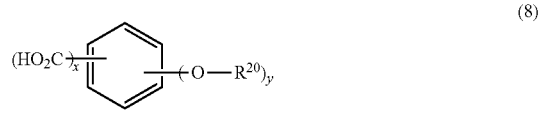
(8)

wherein each $R^{20}$ is independently chosen from $C_{3-10}$ alkenyl and $C_{1-10}$ alkyl-(O—$C_{3-10}$ alkenyl)$_z$; x and y are independently 1 or 2; and z is an integer of 1-3; provided that y=2 when $R^{20}$ is $C_{3-10}$ alkenyl; and

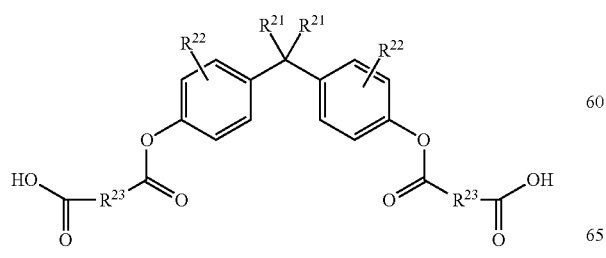
(9)

wherein each $R^{21}$ is independently chosen from H and $C_{1-10}$ alkyl; each $R^{22}$ is independently $C_{2-20}$ alkenyl, each $R^{23}$ is chosen from $C_{2-10}$ alkyl and $C_{2-10}$ alkenyl.

14. A polymer comprising as polymerized units one or more arylcyclobutene first monomers of the formula:

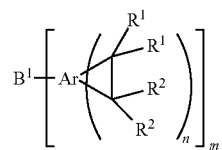

wherein $B^1$ is an m-valent linking group; Ar is a polyvalent aryl group and the carbon atoms of the cyclobutene ring are bonded to adjacent carbon atoms on the same aromatic ring of Ar; m is an integer of 1 or more; n is an integer of 1 or more; each of $R^1$ and $R^2$ is independently a monovalent group; the two $R^1$ moieties may be taken together along with the carbon to which they are attached to form a carbonyl or thiocarbonyl; and the two $R^2$ moieties may be taken together along with the carbon to which they are attached to form a carbonyl or thiocarbonyl, and one or more second monomers of the formula

$(A)_p$-Z$(E)_q$ wherein each A is independently an organic residue having from 1 to 20 carbon atoms and a moiety chosen from carboxylic acid, protected carboxylic acid and sulfonic acid; each E is independently an organic residue having from 2 to 20 carbon atoms and one or more dienophilic moieties; Z is a chemical bond or an organic residue having from 1 to 30 carbon atoms; p is an integer from 1 to 6; and q is an integer from 2 to 6; wherein wherein the protected carboxylic acid is an ester having a quaternary carbon bonded directly to the alkoxy oxygen of the ester group; and wherein the one or more second monomers are free of benzocyclobutene moieties.

15. The polymer of claim 14 wherein the dienophilic moieties comprise one or more of ethylenic unsaturation (double bond) and acetylenic unsaturation (triple bond).

16. The polymer of claim 14 wherein at least one second monomer is chosen from formulae (6) to (9):

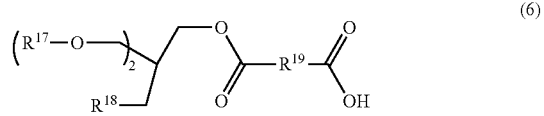
(6)

wherein each $R^{17}$ is independently chosen from $C_{3-10}$ alkenyl; $R^{18}$ is chosen from $C_{1-10}$ alkyl, $C_{3-10}$ alkenyl, and —$OR^{15}$; and $R^{19}$ is chosen from $C_{2-10}$ alkyl and $C_{2-10}$ alkenyl;

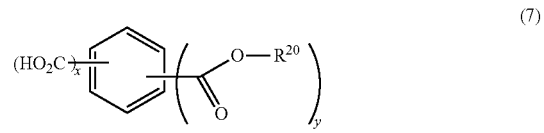
(7)

-continued
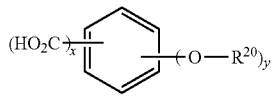
(8)
wherein each $R^{20}$ is independently chosen from $C_{3-10}$ alkenyl and $C_{1-10}$ alkyl-$(O-C_{3-10}$ alkenyl$)_z$; x and y are independently 1 or 2; and z is an integer of 1-3; provided that y=2 when $R^{20}$ is $C_{3-10}$ alkenyl; and
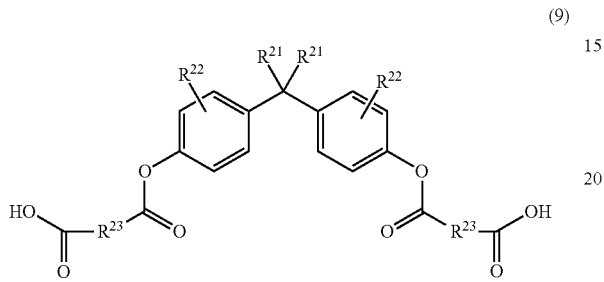
(9)
wherein each $R^{21}$ is independently chosen from H and $C_{1-10}$ alkyl; each $R^{22}$ is independently $C_{2-20}$ alkenyl, each $R^{23}$ is chosen from $C_{2-10}$ alkyl and $C_{2-10}$ alkenyl.
* * * * *